(12) United States Patent
Terdalkar et al.

(10) Patent No.: US 9,194,377 B2
(45) Date of Patent: Nov. 24, 2015

(54) AUXILIARY STEAM SUPPLY SYSTEM IN SOLAR POWER PLANTS

(71) Applicant: ALSTOM Technology Ltd, Baden (CH)

(72) Inventors: Rahul J. Terdalkar, East Windsor, CT (US); Romain Girard, Besancon (FR)

(73) Assignee: ALSTOM Technology Ltd, Baden (CH)

( * ) Notice: Subject to any disclaimer, the term of this patent is extended or adjusted under 35 U.S.C. 154(b) by 211 days.

(21) Appl. No.: 14/074,889

(22) Filed: Nov. 8, 2013

(65) Prior Publication Data
US 2015/0128593 A1    May 14, 2015

(51) Int. Cl.
| | |
|---|---|
| F03G 6/00 | (2006.01) |
| F01K 3/02 | (2006.01) |
| F01K 7/16 | (2006.01) |
| F01K 13/02 | (2006.01) |
| F03G 6/06 | (2006.01) |

(52) U.S. Cl.
CPC . *F03G 6/003* (2013.01); *F01K 3/02* (2013.01); *F01K 7/16* (2013.01); *F01K 13/02* (2013.01); *F03G 6/00* (2013.01); *F03G 6/06* (2013.01); *F03G 2006/008* (2013.01)

(58) Field of Classification Search
CPC ............. F03G 6/003; F03G 6/06; F03G 6/00; F03G 2006/008; F01K 13/02; F01K 3/02; F01K 7/16
USPC ........... 60/641.8–641.15, 646, 657, 653, 659, 60/670
See application file for complete search history.

(56) References Cited

U.S. PATENT DOCUMENTS

| | | | | |
|---|---|---|---|---|
| 8,307,821 | B2 * | 11/2012 | Jukkola et al. | 126/643 |
| 8,474,261 | B2 * | 7/2013 | Rop | 60/641.8 |
| 2012/0240577 | A1 * | 9/2012 | Mandelberg et al. | 60/641.15 |
| 2013/0312411 | A1 * | 11/2013 | Newman | 60/641.8 |
| 2014/0196455 | A1 * | 7/2014 | Kuo | 60/641.8 |

FOREIGN PATENT DOCUMENTS

| | | |
|---|---|---|
| DE | 102010041903 A1 | 4/2012 |
| EP | 1873397 A2 | 1/2008 |
| EP | 2525051 A1 | 11/2012 |

* cited by examiner

*Primary Examiner* — Hoang Nguyen

(57) ABSTRACT

An auxiliary steam supply system in a solar power plant includes a solar receiver having a superheater section, a turbine, a steam circuit, a thermal energy storage arrangement and an auxiliary steam circuit. The thermal energy storage arrangement, including a thermal energy storage medium, is configured for the steam circuit to receive a portion of the steam to heat the thermal energy storage medium. The thermal energy storage arrangement may receive the steam from any location across the superheater section. Moreover, the auxiliary steam circuit generating auxiliary steam flow, which thermally communicates with the thermal energy storage arrangement to be heated, is introduced to any location across the superheater section. Capacity of the thermal energy storage arrangement may be relatively small as compared to the solar receiver and may be compact for placement on top of a tower.

19 Claims, 11 Drawing Sheets

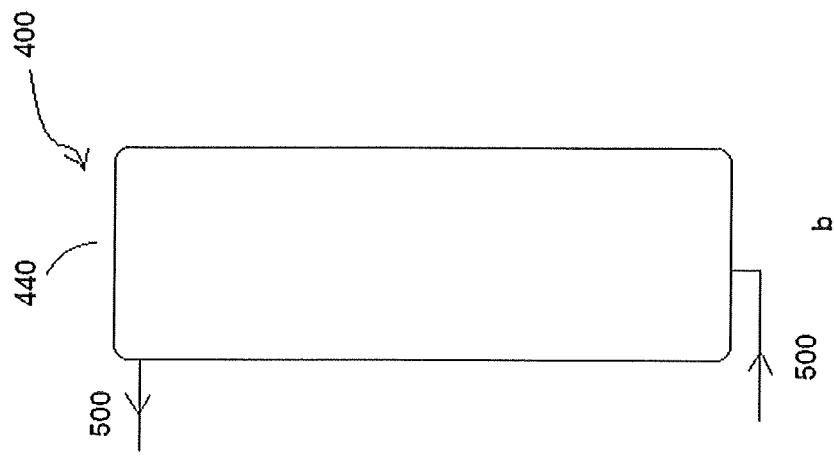
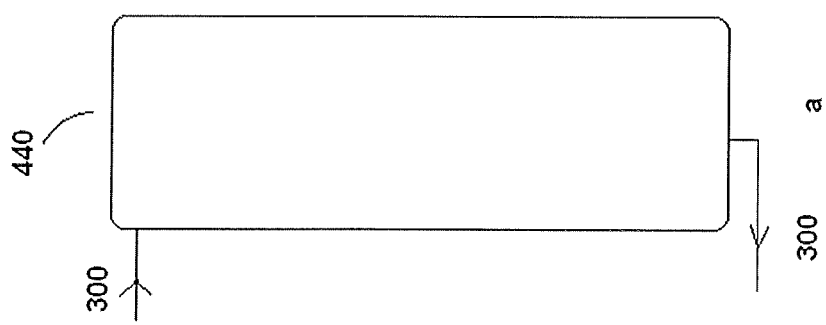
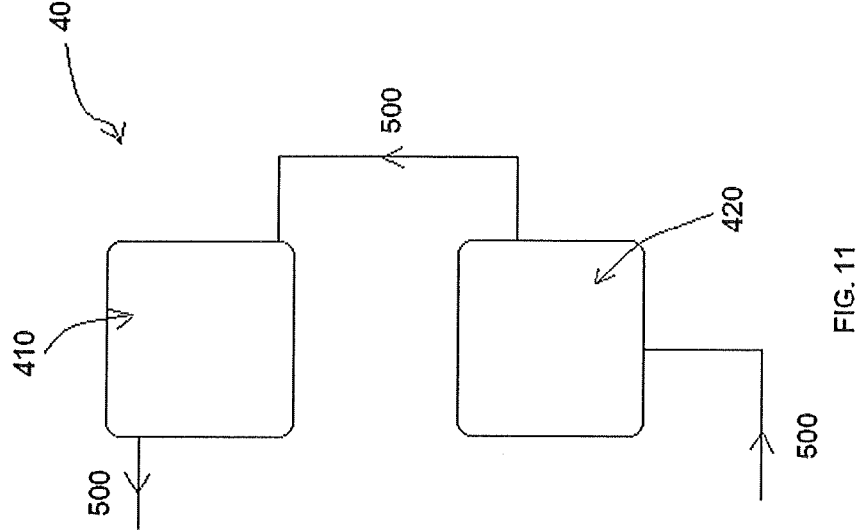

AUXILIARY STEAM SUPPLY SYSTEM IN SOLAR POWER PLANTS

TECHNICAL FIELD

The present disclosure relates to solar thermal power plants using a water-steam power tower receiver.

BACKGROUND

Certain steam generators or boilers used in power plants are subject to frequent shutdown and startup. For example, concentrated solar thermal power plants using power tower technology depend on solar energy to operate during the daytime while shutting down in the night (referred as shutdown period).

Such concentrated solar power plants use solar boilers placed at a top of a tower to produce steam used to operate steam turbines for the production of electricity utilizing generators. Generally, a solar boiler may, apart from various other components, include an evaporator section and high temperature components, such as a superheater section and/or a reheater section. The evaporator section produces steam and supplies it to the high temperature components, such as the superheater section, which superheats the steam to supply relatively high temperature superheated steam for operating the steam turbine. Each of the evaporator section or the superheater section includes various fluidically connected panels, which are heated by focusing sunrays from a heliostat field thereon, thereby heating fluid to be utilized to produce electricity.

During normal operation, the high temperature components, such as the panels of the superheater section, reach their operating temperature, and during the shutdown period they lose heat due to ambient convective cooling and radiative cooling to a relatively lower or higher residual temperature than that required for starting up the power plant in the morning. As such, starting up of the power plant without any preparation may lead into various problems such as fatigue damage of the superheater panels due to substantial differences between the temperature of the steam coming from the evaporator section and the metal temperature of the superheater components. This temperature difference between the steam and superheater components may generate through wall temperature gradients therein causing thermal stress.

In order to balance such thermal stress and improve the life/reduce the fatigue of superheater panels or components, conventionally, auxiliary steam is circulated therethrough in order to preheat or precool the superheater components. The amount of auxiliary steam required is very small as compared to the total steam generation capacity of the solar receiver. A conventional source of auxiliary steam in power plants is from a fossil fuel fired boiler or from an electric boiler. However, problems associated with such fossil fuel boilers are the use of fossil fuels and the variable operating costs based on fossil fuel usage. Fossil fuel use increases carbon emissions of the power plant. Electric boiler use increases the use of parasitic power. Solar thermal power plants have a maximum cap limit for fossil fuel or parasitic power usage. Further, substantial cost and thermal inertia are associated with piping installed running from a bottom to a top of the tower. Moreover, in event of a cloudy season, the solar receiver operates at a relatively high pressure, usually making introduction of auxiliary steam difficult. This is because in such a case the solar boilers operate at a higher pressure than those of the fossil fuel or electric boilers. Depressurization of the solar boiler may lead to significant delays in the subsequent startup thereof. Further, if the evaporator section is isolated from the superheater section and the pressure therebetween is different, it may be difficult to establish connection therebetween.

Accordingly, there exists a need to preclude conventional techniques of auxiliary steam generation to preheat and precool the superheater section, which does not rely on a fossil fuel fired or electric boiler for auxiliary steam supply.

SUMMARY

The present disclosure describes an auxiliary steam supply system that uses a thermal energy storage arrangement in a solar power plant in the following simplified summary, to provide a basic understanding of one or more aspects of the disclosure intended to overcome the above discussed drawbacks, and include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description presented hereinafter.

An object of the present disclosure is to describe an auxiliary steam supply system using a thermal energy storage arrangement in a solar power plant, configured to preclude conventional techniques of auxiliary steam generation, such as, using fossil fuel fired or electric boilers, to preheat and/or precool the superheater section in a convenient manner. Various other objects and features of the present disclosure will be apparent from the following detailed description and claims.

The above noted and other objects may be achieved by having an auxiliary steam supply system (hereinafter also referred to as 'system') in a solar operated power plant. The system includes a solar receiver, a turbine, a steam circuit, a thermal energy storage arrangement and an auxiliary steam circuit. The solar receiver includes a superheater section having a plurality of superheater panel arrangements. The solar receiver is adapted to generate steam and heat steam flowing therethrough. Further, the turbine is operable using steam received from the solar receiver flowing through the plurality of superheater panel arrangements. The steam circuit is configured to enable steam flow from the solar receiver to the turbine through the plurality of superheater panel arrangements, for turbine operation. Further, the thermal energy storage arrangement has a thermal energy storage medium, and is configured to the steam circuit to receive a predetermined portion of the steam from the receiver steam circuit to heat/charge the thermal energy storage medium. The thermal energy storage arrangement is capable of receiving the steam to heat the thermal energy storage medium from any desired location across the plurality of superheater panel arrangements, such as from an exit location or locations in-between the panels. The predetermined portion of the steam that is received by the thermal energy storage arrangement from the total steam produced in the solar receiver during the normal operating condition is about 0% to about 10%, while the remaining majority portion of the steam goes to the steam turbine. The thermal energy storage arrangement may not include condensation of the steam flowing therethrough. Moreover, the auxiliary steam circuit is configured to circulate an auxiliary steam flow and is in thermal communication with the thermal energy storage arrangement to enable the auxiliary steam flow to be heated from the thermal energy storage medium and introduced in the plurality of superheater panel arrangements to attain predetermined conditions thereof. The auxiliary steam flow thus discharges the thermal energy storage arrangement. The heated auxiliary steam flow coming out of the thermal energy storage arrangement is adapted to be introduced at any desired location across the plurality of superheater panel arrangements, such as at the exit location or at the locations in-between the panels.

In one embodiment, the capacity of the thermal energy storage arrangement is configured to be used in the auxiliary steam supply system may be relatively small as compared to the capacity of the solar receiver. In such embodiment, the relatively small thermal energy storage arrangement may be placed on a top of a solar tower along with the solar receiver.

In one embodiment of the present disclosure, the auxiliary steam circuit is capable of being activated for a predetermined time: former to activation of the receiver steam circuit, as the pre-startup preparation of the solar operated power plant, and, after cessation of the receiver steam, as the post-shutdown preparation of the solar operated power plant. Herein the steam circuit may also be referred as 'receiver steam circuit,' and the steam produced in the solar receiver may also be referred to as 'receiver steam' and are referred interchangeably through the description.

In one embodiment of the present disclosure, the solar receiver comprises a steam drum and an evaporator section in thermal communication with the superheater section to generate the steam to be heated in the superheater section. In this embodiment, the steam circuit enables the steam to flow from the solar receiver, flowing from the steam drum, to the superheater and then to the turbine. Further in this embodiment, the auxiliary steam flow in the auxiliary steam circuit is configured to be generated from the steam drum of the receiver. In this embodiment, the steam drum is adapted to utilize heat flux of the evaporator section to generate saturated steam flow to be used as the auxiliary steam for being heated in the thermal energy storage arrangement. Moreover, in one aspect of this embodiment, the auxiliary steam circuit includes valve arrangements adapted to depressurize the steam drum to produce the auxiliary steam flow for being heated in the thermal energy storage arrangement. In this embodiment, the thermal energy storage arrangement may not generate the auxiliary steam, but may only superheats the saturated steam supplied thereto.

In one another embodiment of the present disclosure, the system may include a feedwater heating arrangement adapted to fluidically communicate to the thermal energy storage arrangement to produce the auxiliary steam flow upon being heated in the thermal energy storage arrangement.

In one another embodiment of the present disclosure, the system may include a steam accumulator adapted to fluidically communicate to the thermal energy storage arrangement to produce the auxiliary steam flow upon being heated in the thermal energy storage arrangement.

In one embodiment of the present disclosure, the thermal energy storage arrangement includes an arrangement configuring two separate storage tanks, i.e. first and second storage tanks, and a heat exchanger. The first and second storage tanks are adapted to store the thermal energy storage medium. Specifically, the first storage tank is adapted to store the relatively hot thermal energy storage medium, and the second storage tank is adapted to store the relatively cold thermal energy storage medium. Further, the heat exchanger is adapted to be disposed between the first and second storage tanks. During charging of the thermal energy storage arrangement the relatively cold thermal energy storage medium is adopted to absorb heat from the charging steam introduced into the thermal energy storage arrangement thereby becoming relatively hot thermal energy storage medium. The relatively hot thermal energy storage medium is stored into the first storage tank. During discharging, the relatively hot thermal energy storage medium from the first storage tank is adapted to supply the heat to the auxiliary steam flow in the heat exchanger and subsequently stored in the second storage tank. A pump is used to develop flow of the thermal energy storage medium from one tank to other through the heat exchanger.

In one another embodiment of the present disclosure, the thermal energy storage arrangement includes a single storage tank and a heat exchanger. The single storage tank of this embodiment is adapted to be divided into first and second sections using a partition wall to store the thermal energy storage medium. The first section is adapted to store the relatively hot thermal energy storage medium, and the second section is adapted to store the relatively cold thermal energy storage medium. Further the heat exchanger is fluidically configured to the storage tank. As described above, during charging of the thermal energy storage arrangement, the relatively cold thermal energy storage medium is adopted to absorb heat from the steam introduced into the thermal energy storage arrangement thus becoming relatively hot thermal energy storage energy. The relatively hot thermal energy storage medium is stored into the first section of the storage tank. During discharging, the relatively hot thermal energy storage medium from the hot section of the tank supplies the heat to the auxiliary steam flow in the heat exchanger and stored in the second section. Similar to above embodiment, a pump is used to develop flow of thermal energy storage medium from the first section to the second section through the heat exchanger.

In one further embodiment of the present disclosure, the thermal energy storage arrangement includes a shell and tube heat exchanger. The shell and tube heat exchanger having a shell side and a tube side. The thermal energy storage medium is stored on the shell side, and the charging steam as well as the auxiliary steam flows through the tube side to heat and cool the thermal energy storage medium respectively.

In one yet another embodiment of the present disclosure, the thermal energy storage arrangement includes a first member and a second member. The first member is adapted to use the thermal energy storage medium at a lower operating temperature range. Further, the second member is adapted to use the thermal energy storage medium at a higher operating temperature range. The hot thermal energy storage medium at the lower and higher temperatures may be adapted to supply the heat to the auxiliary steam flow gradually. The thermal energy storage mediums in the two systems may be different. Typical examples of the thermal energy storage mediums can be molten salt and thermic oil.

In one additional embodiment of the present disclosure, the thermal energy storage arrangement includes a solid storage medium adapted to be heated and retain the heat from the thermal energy storage medium. The retained heat in the solid body is adapted to be supplied to the auxiliary steam flow to be heated.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawings, wherein like elements are identified with like symbols, and in which:

FIGS. 8 to 12 are schematic views of various examples of a thermal energy storage arrangement, in accordance with various exemplary embodiments of the present disclosure.

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "top," "bottom," and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
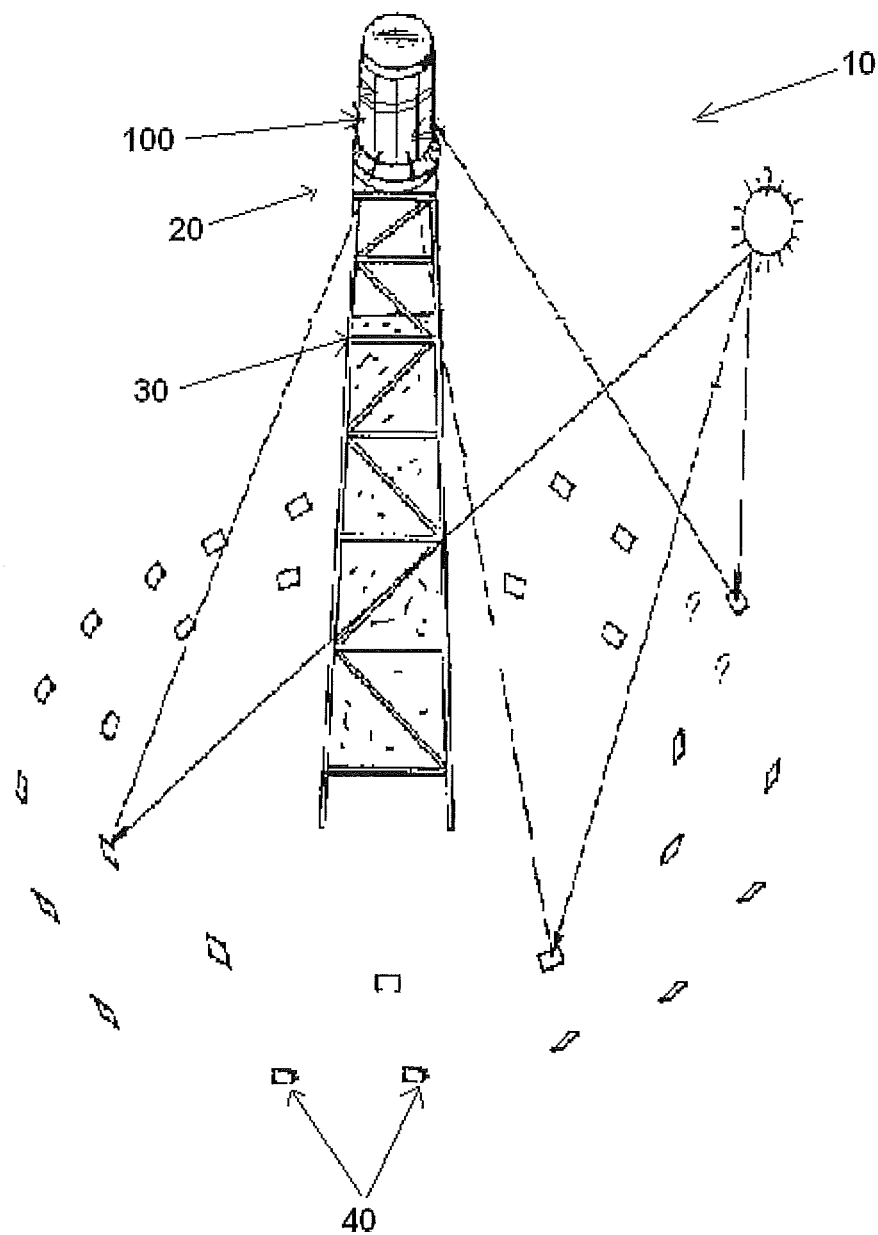
FIG. 1 is a schematic view of a tower type solar power plant, in accordance with an exemplary embodiment of the present disclosure.
Figure 2:
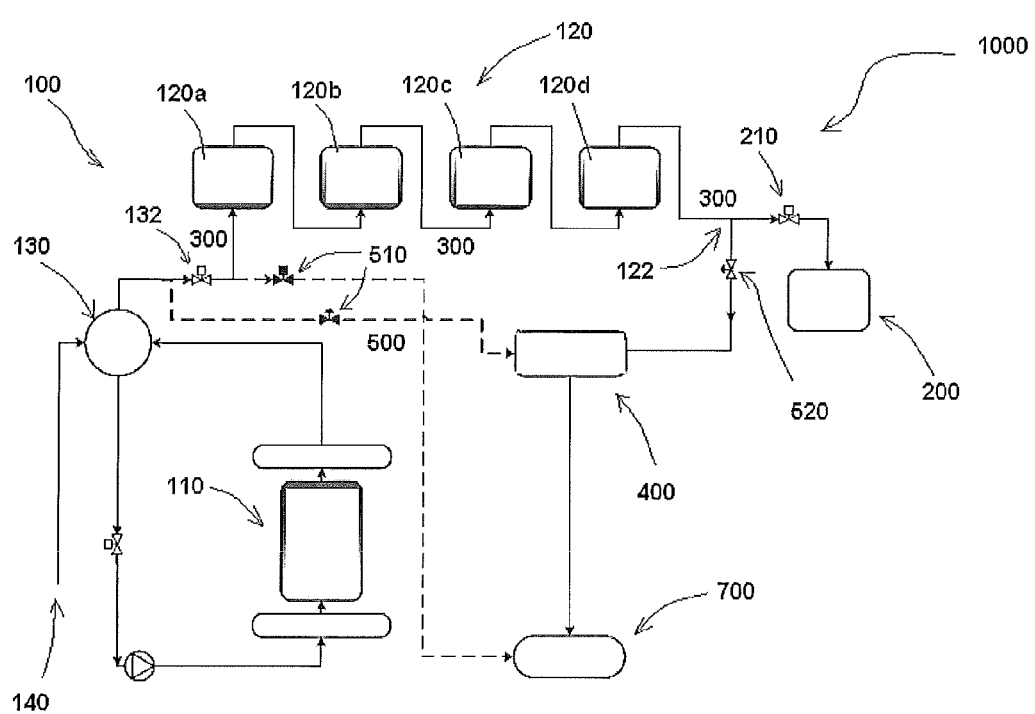
FIG. 2 is a schematic view of an auxiliary steam supply system in a solar power plant depicting a first embodiment of charging (gaining heat) a thermal energy storage arrangement, in accordance with an exemplary embodiment of the present disclosure.

Referring now to FIGS. 1 and 2, in conjunction to each other. As shown therein, FIG. 2 schematically illustrates an auxiliary steam supply system 1000 (hereinafter referred to as 'system 1000') in a solar operated power plant 10 as shown in FIG. 1. Such system 1000 may, apart from various other utility, be utilized for at least one of pre-startup and post-shutdown preparations of a power plant 10 having a steam generating source, such as the solar operated power plant 10 with a solar receiver 100. However, where the system 1000 is utilized with respect to other power plants other than the solar power plant, the solar receiver 100 may be replaced by a steam generator. The system 1000 for the solar operated power plant 10 may typically include a concentrated solar tower assembly 20 having a tower structure 30 and as above mentioned a solar receiver 100 placed at top thereof, where solar rays are concentrated from heliostat field 40 for production of electricity by utilizing a turbine 200. Specifically, the solar receiver 100 includes an evaporator section 110, a superheater section 120 and a steam drum 130 for the process of generating steam. Each of the evaporator section 110 and the superheater section 120 includes various tubes or tube panels (as shown in FIG. 2, a plurality of superheater panel arrangements 120a-120d) through which steam flows for carrying the solar heat accumulated therein due to concentrated solar rays by the heliostat field 40.

In as much as the construction and arrangement of the system 1000 for the solar operated power plant 10 having the tower structure 30, the solar receiver 100 and the heliostat field 40 are all well-known to those skilled in the art, it is not deemed necessary for purposes of acquiring an understanding of the present disclosure that there be recited herein all of the constructional details and explanation thereof. Rather, it is deemed sufficient to simply note that as schematically shown in FIGS. 2 to 12, depicting the system 1000 and various associated components thereof for pre-startup preparation of the solar operated power plant 10 of FIG. 1 that may be successfully utilized in relation to any solar operated power plants 10 or any other power plants (other than solar) that are subject to frequent startups and shutdowns. Further, it should be understood that the solar receiver 100 may include a variety of components for performing their assigned purpose, and only those components are shown that are relevant for the description of various embodiments of the present disclosure.

As shown in FIGS. 2 to 7, the solar receiver 100 of the system 1000 includes the evaporator section 110 configured fluidically to the superheater section 120 via the steam drum 130 for generating the steam. During normal operation, the solar receiver 100 receives the solar heat to heat the steam flowing therethrough. Specifically, the evaporator section 110 is adapted to generate the steam to be supplied to the superheater section 120 via passing through the steam drum 130. The evaporator section 110 receives feedwater from a feedwater supply 140 through the steam drum 130 and converts thereto into steam to be stored back in the steam drum 130. The steam from the steam drum 130 is supplied to the superheater section 120 for obtaining superheated steam via using a regulating valve 132. The superheated steam is supplied to the turbine 200 for producing electricity. Feedwater is converted into steam and then steam into superheated steam in the solar receiver 100 which is then adapted to be towards the turbine 200, thereby defining a steam circuit 300. The steam circuit 300 enabling the steam flow from the solar receiver 100, flowing from the steam drum 130, to the turbine 200 through the plurality of superheater panel arrangements 120a-120d to operate the turbine 200, shown as solid lines in FIGS. 2 and 3. Further, a valve 210 may be incorporated in the steam circuit 300 to regulate the supply of the superheated steam in the turbine 200.

In one embodiment of the present disclosure, however not shown herein, the system 1000 may also include a reheat section and an economizer (not shown) configured to the solar receiver 100. The reheat section is capable of reheating the steam, for example in case of multistage turbines, to supply the heated steam at desired stages. Further, the economizer increases the temperature of the steam (specifically feedwater) as per requirement. The economizer supplies feedwater to the evaporator section 110 for further operations.

Figure 3:
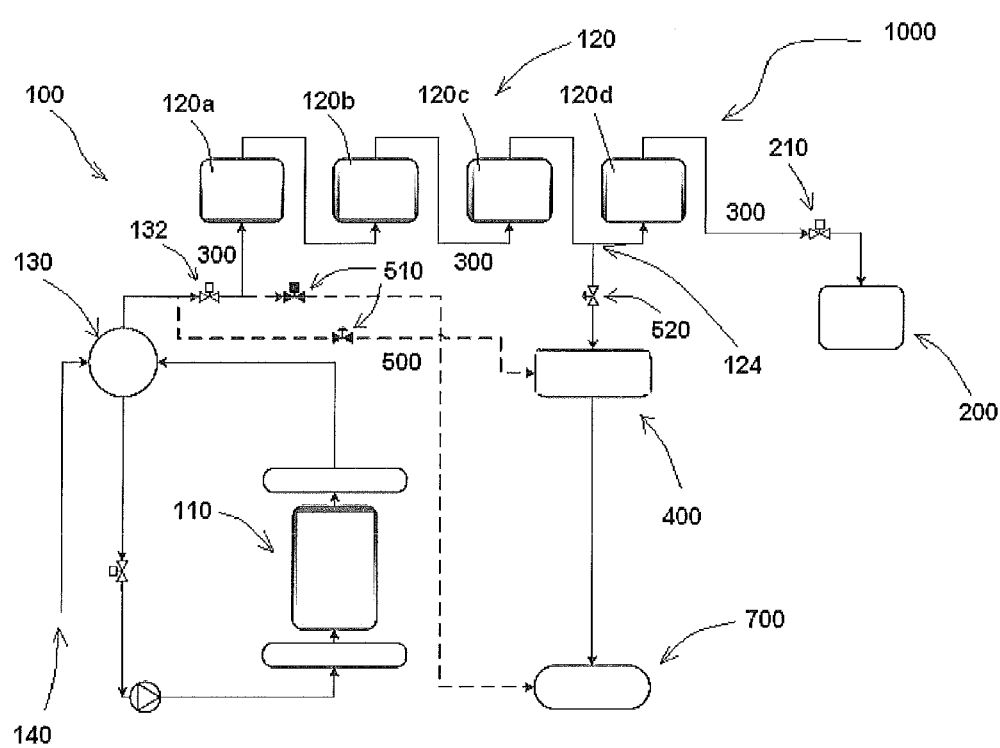
FIG. 3 is a schematic view of an auxiliary steam supply system in a solar power plant depicting a second embodiment of charging of a thermal energy storage arrangement, in accordance with an exemplary embodiment of the present disclosure.

As shown in FIGS. 2 and 3 (shown in solid lines), for power generation from the power plant 10, the steam in the steam circuit 300 is directed to the steam turbine 200. However, as mentioned earlier, some plants (such as solar plants) are subject to frequent startups and shutdowns, and problems often arise upon restarting such power plants. Therefore, the power plant requires pre-startup and post-shutdown preparations to bring the temperature of the superheater panels' 120a-120d a desired temperature value. For doing so, as discussed earlier, conventionally, auxiliary steam is circulated therethrough in order to preheat or precool the superheater section 120, where the conventional sources of the auxiliary steam in the power plants are usually from a fossil fuel fired boilers or from electric boiler adding up to carbon emissions and parasitic power consumption. Therefore the present invention provides a thermal energy storage arrangement 400 that precludes conventional technique of generating auxiliary steam.

The thermal energy storage arrangement 400 includes a thermal energy storage medium, such as molten salt, thermic oil or any other suitable medium. The thermal energy storage arrangement 400 is configured to the steam circuit 300 to receive a predetermined portion of the steam from the steam circuit 300 to heat the thermal energy storage medium. In one embodiment of the present disclosure, the capacity of the thermal energy storage arrangement 400 may relatively be small as compared to the capacity of the solar receiver 100. In such embodiment, the thermal energy storage arrangement 400 may be smaller in size and be placed on the top of the tower 30 along with the solar receiver 100. Further, in such embodiment, since thermal energy storage arrangement 400 is relatively small, the predetermined portion of the steam that is received by the thermal energy storage arrangement 400 from the total stream produced in the solar receiver 100 during the normal operating condition is about 0% to about 10%, while a remaining majority portion of the steam goes to the steam turbine 200. Further, a valve 520 may be configured and partially opened for receiving the predetermined portion of the superheated steam from the superheater section 120 to charge the thermal energy storage arrangement 400. The thermal energy storage arrangement 400 is capable of receiving the steam to heat the thermal energy storage medium from any desired location of the superheater section 120. For example, the desired locations may be at an exit 122 of the superheater panels 120d prior to the turbine engine 200, as shown in FIG. 2, or at locations, such as 124, in-between the plurality of superheater panel arrangements 120a-120d, as shown in FIG. 3.

Figure 4:
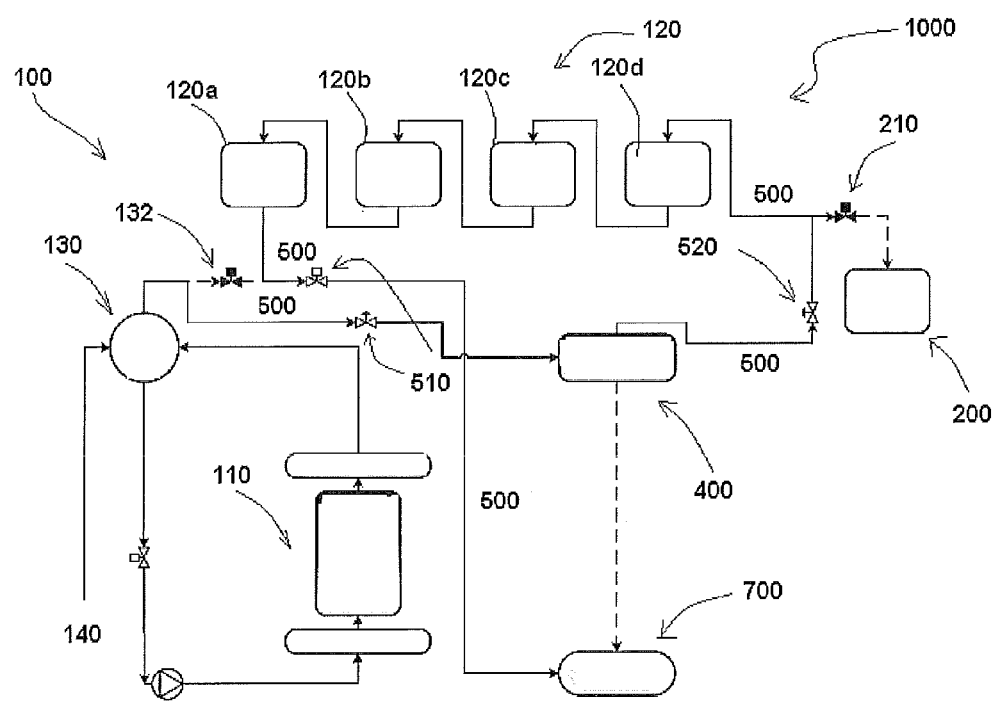
FIG. 4 is a schematic view of an auxiliary steam supply system in a solar power plant depicting a first embodiment of discharging (loosing heat) of a thermal energy storage arrangement, in accordance with an exemplary embodiment of the present disclosure.
Figure 5:
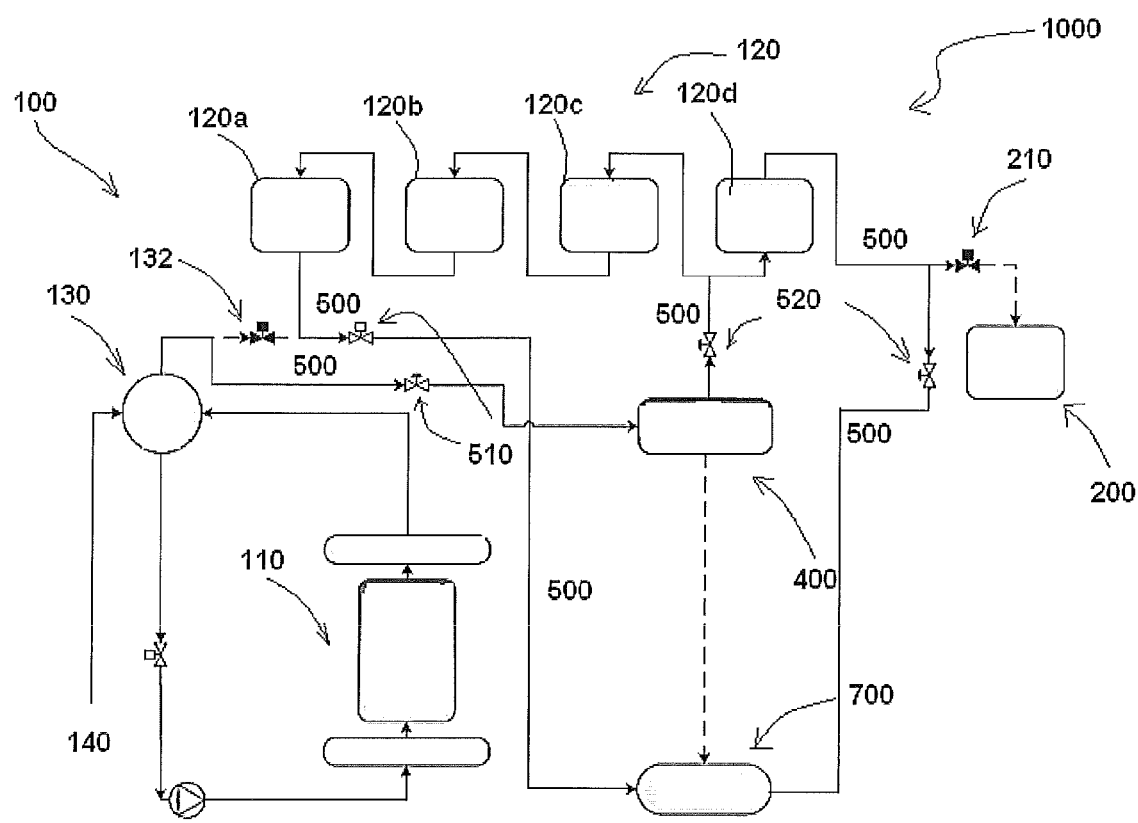
FIG. 5 is a schematic view of an auxiliary steam supply system in a solar power plant depicting a second embodiment of discharging of a thermal energy storage arrangement, in accordance with an exemplary embodiment of the present disclosure.

The thermal energy storage arrangement 400 having the heated thermal energy storage medium may be utilized for generating the auxiliary steam flow. For doing so, as shown in FIGS. 4 and 5 (in solid line path), an auxiliary steam circuit 500 is introduced in the system 1000. In one embodiment as shown in FIGS. 4 and 5, the auxiliary steam circuit 500 is configured to receive the auxiliary steam flow from the steam drum 130 to thermally communicate with the thermal energy storage arrangement 400 to enable the auxiliary steam flow to be heated from the thermal energy storage medium and introduced into the plurality of superheater panel arrangements 120a-d to attain predetermined conditions thereof. During this time, the valves 132 and 210 remain closed. The auxiliary steam flow is adapted to be introduced into the thermal energy storage arrangement 400 to at least, at the exit 122 of the plurality of superheater panel arrangements 120a-d prior to the turbine 200, as shown in FIG. 4, or at suitable locations, such as 124 in-between the plurality of superheater panel arrangements 120a-d, as shown in FIG. 5.

In the embodiment, as shown in FIGS. 4 and 5, in one aspect, the auxiliary steam circuit 500 includes valve arrangements 510 adapted to depressurize the steam drum 130 to produce the auxiliary steam flow for being heated in the thermal energy storage arrangement 400. Further, the valve 520 incorporated in the auxiliary steam circuit 500 also regulates the auxiliary steam flow in the superheater panels 120a-d apart from receiving the portion of steam for heating/charging the thermal energy storage medium. In one further embodiment, heat flux may also be used to evaporate water in the evaporator section 110 to produce the auxiliary steam flow for the thermal energy storage arrangement 400. As shown in FIGS. 2 and 3, while normal operations of the power plant, the auxiliary steam circuit 500 may be isolated, using the valves arrangements 510 from the steam drum 130 (shown in dotted lines) at shutdown position and the valves 132 and 210 at opened position. Further, the valve arrangement 520 may be partially opened for receiving the portion of the superheated steam from the superheater section 120 to charge the thermal energy arrangement 400.

Figure 6:
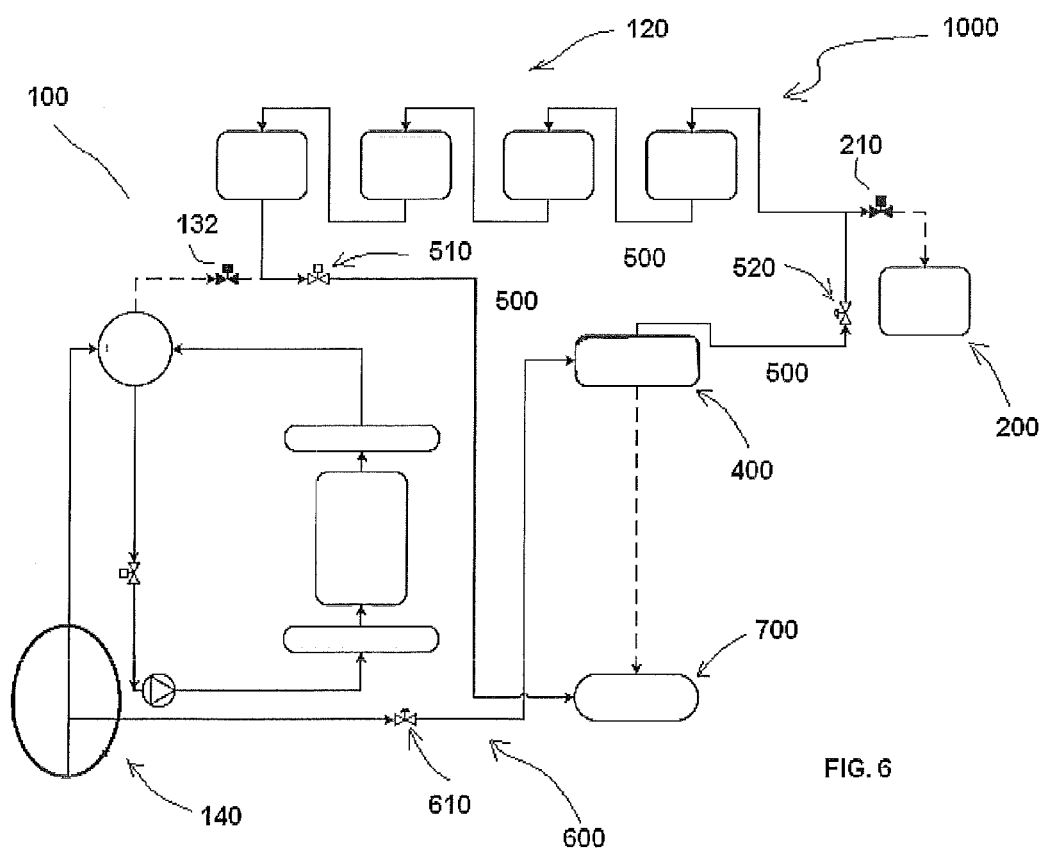
FIG. 6 is a schematic view of an auxiliary steam supply system in a solar power plant depicting a third embodiment of discharging of a thermal energy storage arrangement, in accordance with an exemplary embodiment of the present disclosure.

In another embodiment of the present disclosure, as shown in FIG. 6, a feedwater heating arrangement 600 having the feedwater supply 140 adapted to fluidically communicate to the thermal energy storage arrangement 400 to produce the auxiliary steam flow upon being heated in the thermal energy storage arrangement 400 to be circulated in the auxiliary steam circuit 500, instead of the steam drum 130 as in the above embodiment (in FIGS. 2 to 5). The feedwater heating arrangement 600 produces steam and supply it to the thermal energy storage arrangement 400, where it is charged to be auxiliary steam flow to be circulated in the auxiliary steam circuit 500. In such embodiment, there may also be a valve arrangements 610 adapted to depressurize the feedwater heating arrangement 600 to produce the auxiliary steam flow for being heated in the thermal energy storage arrangement 400 and be circulated in the auxiliary steam circuit 500. Other configurations are same as described in relation to FIGS. 2 to 5.

Figure 7:
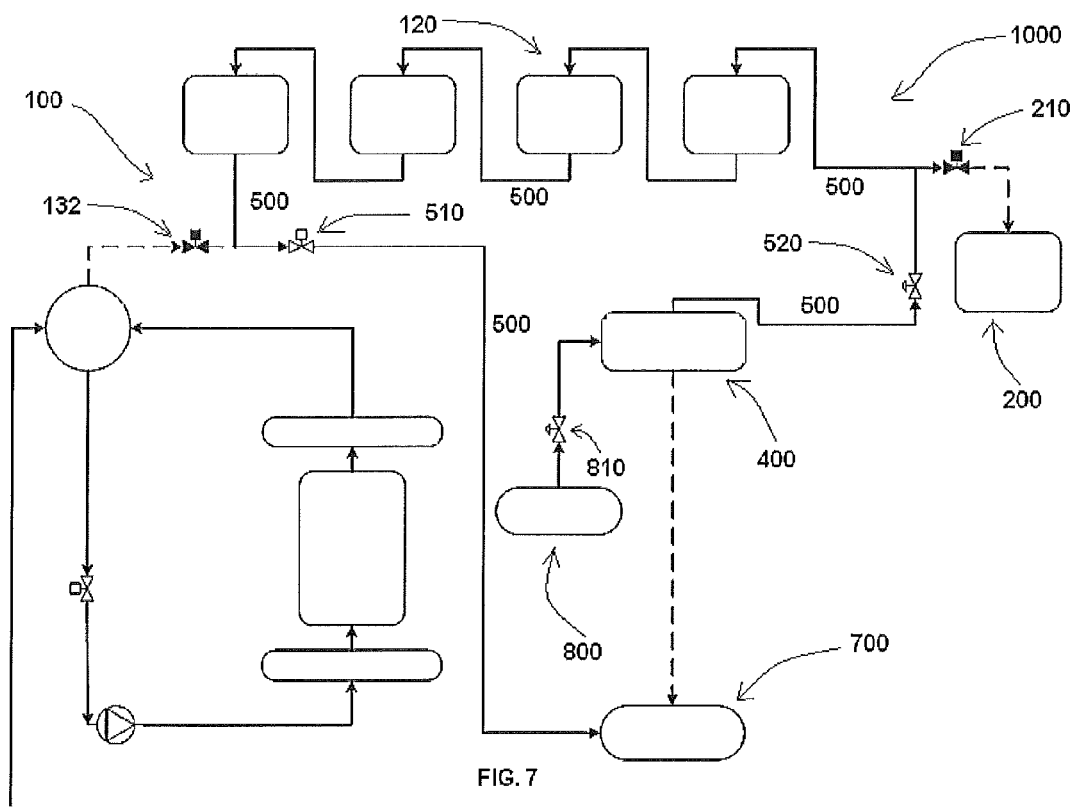
FIG. 7 is a schematic view of an auxiliary steam supply system in a solar power plant depicting a fourth embodiment of discharging of a thermal energy storage arrangement, in accordance with an exemplary embodiment of the present disclosure.

In one further additional embodiment of the present disclosure, as shown in FIG. 7, the system 1000 may include a steam accumulator 800 adapted to fluidically communicate to the thermal energy storage arrangement 400 to produce the auxiliary steam flow upon being heated in the thermal energy storage arrangement 400, instead of the steam drum 130 as in the above embodiment (in FIGS. 2 to 5). The steam accumulator 800 of this embodiment may accumulate the steam from any preferred source to supply the said steam into the thermal energy storage arrangement 400 where it is charged to be the auxiliary steam flow to be circulated in the auxiliary steam circuit 500. Such system 1000 of the FIG. 7 may include a valve member 810 to regulate an amount of the steam required to be supplied to the thermal energy storage arrangement 400 to produce the auxiliary steam flow. Other configurations are same as described in relation to FIGS. 2 to 5.

As shown in all the FIGS. 2 to 7, the system 1000 may include a drainage mechanism 700 to drain the auxiliary steam flow exiting from the superheater section 120 after preheating or precooling thereof.

The auxiliary steam circuit 500 having the auxiliary steam flow generated after charging the steam produced by one of the steam drum 130, the auxiliary feedwater arrangement 600 or the steam accumulator 800 in the thermal energy storage arrangement 400 is capable of enabling the auxiliary steam flow for a predetermined time and at predetermined parameters through the superheater panel arrangements 210a-d, former to activation of the steam circuit 300. The predetermined parameters are a variable of at least one of a predetermined temperature, a predetermined pressure and a predetermined flow rate of the auxiliary steam. The predetermined parameters of the auxiliary steam flow may be such that such parameters may be capable of attaining desired temperature distribution along the superheater panel arrangements 210a-d to minimize thermal stress thereon. Further, such parameter may also be varied while the operation for attaining desired temperature distribution along the superheater panel arrangements 210a-d to minimize thermal stress thereon.

Referring now to FIGS. 8 to 12, various examples of the thermal energy storage arrangements 400 are illustrated. However, without departing from the scope of the present disclosure, there may be various other arrangements apart from the disclosed herein and shall be considered to be within the scope of the present disclosure. Further, FIGS. 8 to 12 are simplified line diagrams and depicted to illustrate general ideas of the thermal energy storage arrangements 400 and may not considered to be limiting to the depiction only as it intend to include various other constructional features which may be required therein.

Figure 8:
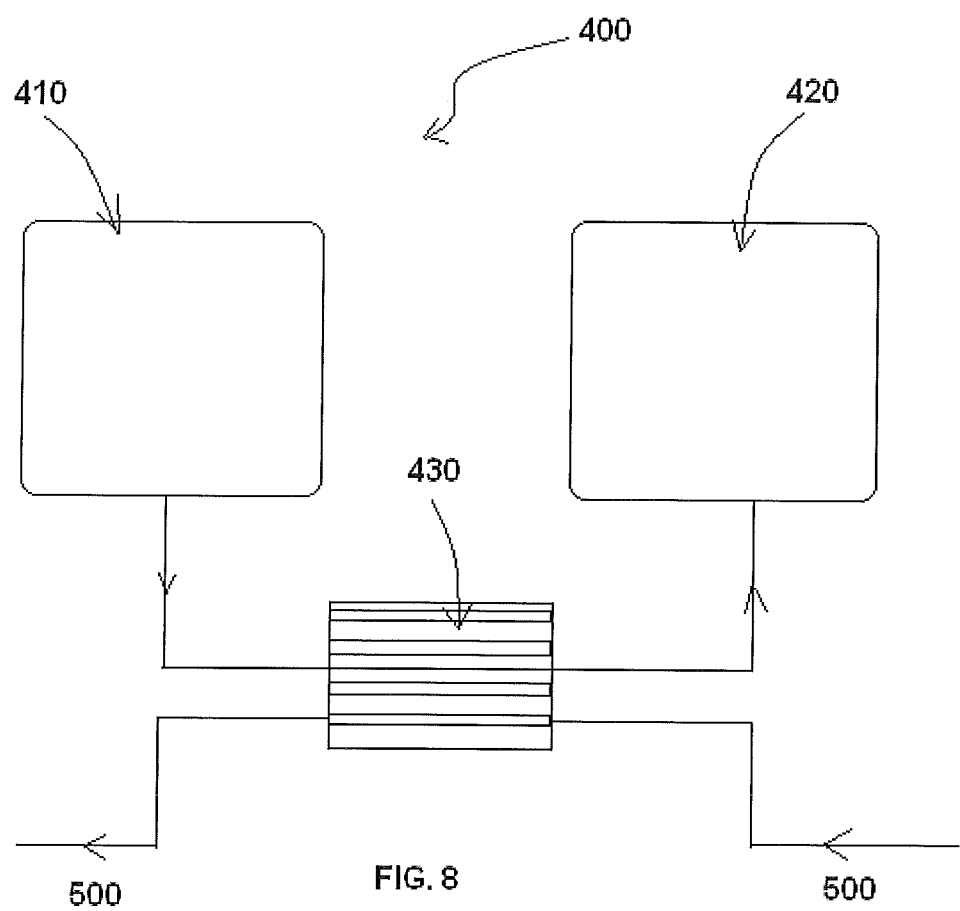

As shown in FIG. 8, in a first example embodiment, the thermal energy storage arrangement 400 includes first and second storage tanks 410, 420 adapted to store the thermal energy storage medium. The first storage tank 410 may store a relatively hot thermal energy storage medium, and the second storage tank 420 may store a relatively cold thermal energy storage medium. The arrangement 400 further includes a heat exchanger 430 disposed between the first and second storage tanks 410, 420. During charging mode, the relatively cold thermal energy storage medium from the second storage tank 420 flows through the heat exchanger 430 to gain heat from the charging receiver steam thus producing relatively hot thermal energy storage medium. The heated thermal energy storage medium is then stored in the first tank 410. During discharging mode, the relatively hot thermal energy storage medium from the first storage tank 410 is configured to supply the heat to the auxiliary steam flow flowing through the auxiliary steam circuit 500 via the heat exchanger 430. Thereafter the resultant relatively cold thermal energy storage medium, whose heat has been utilized and is in a relatively cold state, may be stored in the second storage tank 420.

Figure 9:
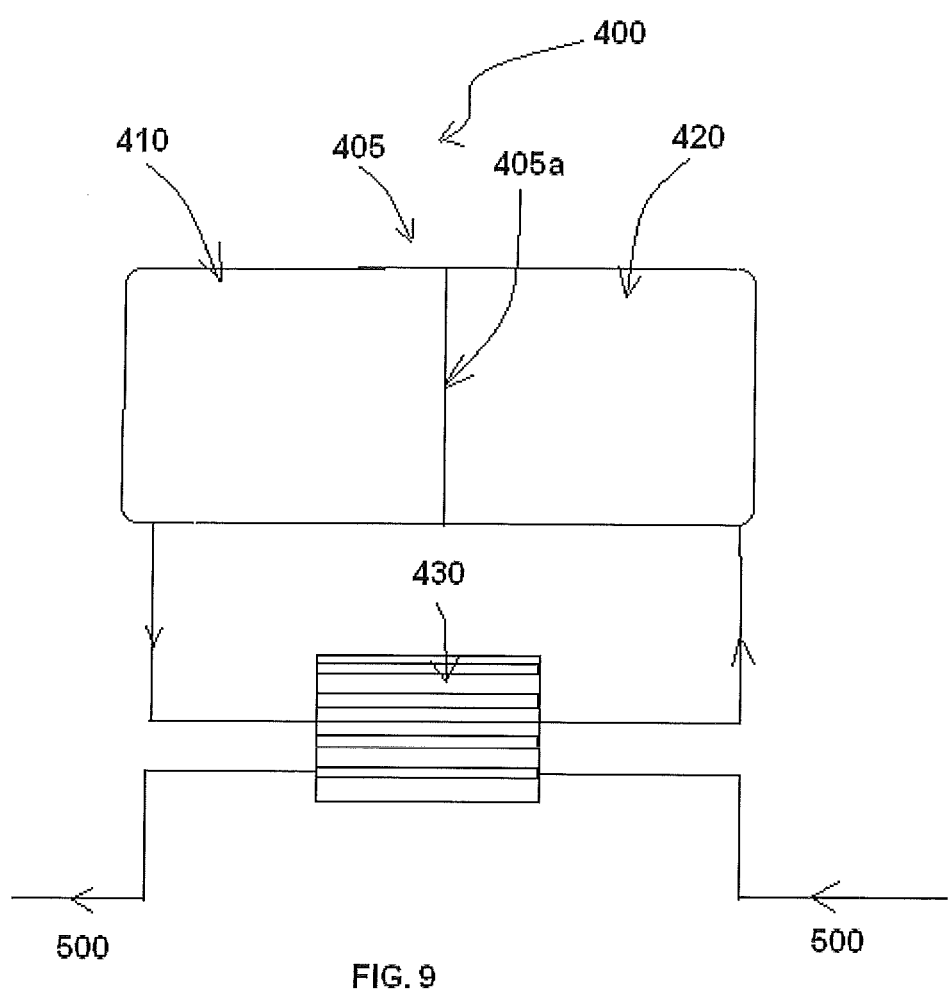

As shown in FIG. 9, in a second example embodiment, the thermal energy storage arrangement 400 includes a single storage tank 405 adapted to be divided by a partition 405a into first and second sections 410, 420 to store the thermal energy storage medium. The first section 410 may store the relatively hot thermal energy storage medium, and the second section 420 is adapted to store the relatively cold thermal energy storage medium. The thermal energy storage arrangement 400 further includes a heat exchanger 430 disposed between the first and second sections 410, 420. During charging mode, the relatively cold thermal energy storage medium from the second section 420 of the single storage tank 405 flows through the heat exchanger 430 to gain heat from the charging receiver steam thus producing relatively hot thermal energy storage medium. The relatively hot thermal energy storage medium is then stored in the first section 410 of the single storage tank 405. During discharging mode, the relatively hot thermal energy storage medium from the first section 410 is configured to supply the heat to the auxiliary steam flow flowing through the auxiliary steam circuit 500 via the heat exchanger 430. Thereafter the resultant relatively cold thermal energy storage medium, whose heat has been utilized and is now in a relatively cold state, may be stored in the second section 420.

Figure 10:
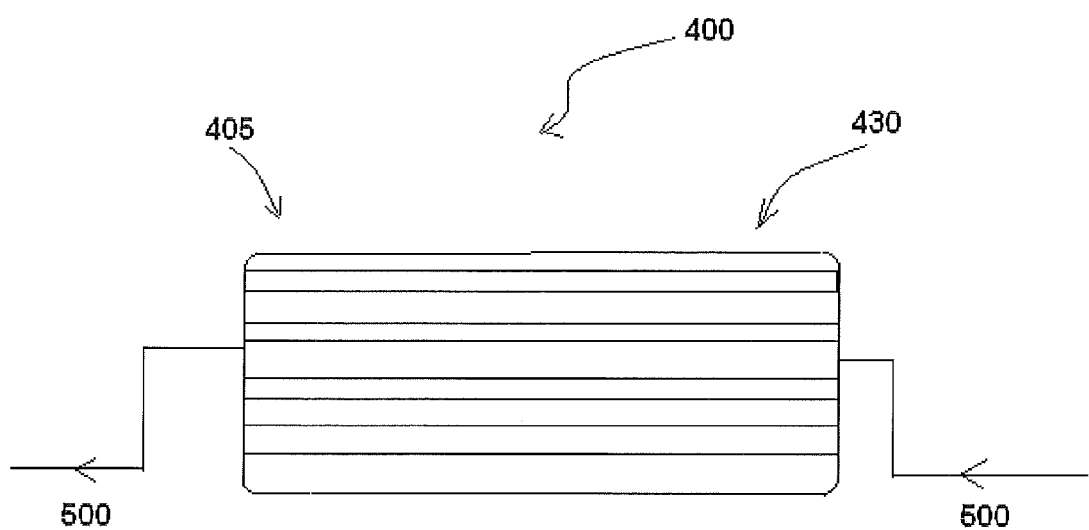

As shown in FIG. 10, in a third example embodiment, the thermal energy storage arrangement 400 may be a shell and tube heat exchanger. The shell and tube heat exchanger 400 includes a shell side 405 and a tube side 430. The thermal energy storage medium is stored on the shell side 405, and the heated steam flow and the auxiliary steam flow through the tube side 430 to heat and cool the thermal energy storage medium respectively. During charging mode, the relatively hot charging steam from the solar receiver 100 heats the thermal energy storage medium on the shell side 405. During discharging mode, the relatively hot thermal energy storage medium from the shell side 405 is configured to supply the heat to the auxiliary steam flow flowing through the auxiliary steam circuit.

As shown in FIG. 11, in a fourth example embodiment, the thermal energy storage arrangement 400 includes a first member 410 and a second member 420. The first member 410 may use the thermal energy storage medium at a lower temperature, while the second storage tank 420 may use the thermal energy storage medium at a higher temperature heated by the steam as described above. The relatively hot thermal energy storage mediums at the lower and higher temperatures are adapted to supply heat to the auxiliary steam flow gradually to the auxiliary steam circuit 500. In one embodiment of the present disclosure, the thermal energy storage mediums used to supply heat to the first and second members 410, 420 may be same, such as molten salt, or may be different, such as molten salt and thermic oil. The first and second members 410, 420 may be the thermal energy storage arrangement in construction.

As, shown in FIG. 12, in a fifth example embodiment, the thermal energy storage arrangement 400 includes a solid body 440 made for example of concrete. The solid body 440 may be heated and retain the heat from the portion of steam diverted, as described above, from the steam circuit 300, shown in (a). Further, the retained heat in the solid body 440 is supplied to the auxiliary steam flow flowing through the auxiliary steam circuit 500 for heating thereto, shown in (b).

The system of the present disclosure is advantageous in various scopes. The system precludes conventional techniques of auxiliary steam generation, which greatly relied on fossil fuel fired or electric boilers, and provides a convenient solution with reduced carbon emission, fossil fuel usage and/ or parasitic power usage. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A auxiliary steam supply system in a solar operated power plant, the system comprising:
    a solar receiver to heat steam flowing therethrough, the solar receiver comprising a superheater section comprising a plurality of superheater panel arrangements;
    a turbine operable on the steam received from the solar receiver flowing through the plurality of superheater panel arrangements;
    a steam circuit enabling the steam flow from the solar receiver to the turbine through the plurality of superheater panel arrangements, to operate the turbine;
    a thermal energy storage arrangement having a thermal energy storage medium, the thermal energy storage arrangement configured to the steam circuit to receive a predetermined portion of the steam from the steam circuit to heat/charge the thermal energy storage medium, wherein the thermal energy storage arrangement is capable of receiving the steam to heat the thermal energy storage medium from at least,
        at an exit of the plurality of superheater panel arrangements prior to the turbine, and
        at desired locations in-between plurality of superheater panel arrangements; and
    an auxiliary steam circuit configured to circulate an auxiliary steam flow, the auxiliary steam circuit configured to thermally communicate with the thermal energy storage arrangement to enable the auxiliary steam flow to be heated/discharged from the thermal energy storage medium and introduced into the plurality of superheater panel arrangements to attain predetermined conditions thereof, wherein the auxiliary steam flow is adapted to be introduced into the receiver superheater section at least,
        at the exit of the plurality of superheater panel arrangements prior to the turbine, and
        at suitable locations in-between the plurality of superheater panel arrangements.

2. The system as claimed in claim 1, wherein the auxiliary steam circuit is capable of being activated for a predetermined time:
    prior to activation of the steam circuit, as the pre-startup preparation of the solar operated power plant, and
    after cessation of the steam, as the post-shutdown preparation of the solar operated power plant.

3. The system as claimed in claim 1, wherein the solar receiver comprises a steam drum and an evaporator section in thermal communication with the superheater section to generate the steam to be heated in the superheater section.

4. The system as claimed in claim 3, wherein the steam circuit enabling the steam to flow from the solar receiver, flowing from the steam drum, to the turbine.

5. The system as claimed in claim 3, wherein the auxiliary steam flow in the auxiliary steam circuit is configured to be generated from the steam drum.

6. The system as claimed in claim 5, wherein the steam drum is adapted to utilize heat flux on the evaporator section to generate the auxiliary steam flow, which is saturated steam flow for being heated in the thermal energy storage arrangement.

7. The system as claimed in claim 3, wherein the auxiliary steam circuit comprises valve arrangements adapted to depressurize the steam drum to produce the auxiliary steam flow for being heated in the thermal energy storage arrangement.

8. The system as claimed in claim 1 further comprising a feedwater heating arrangement adapted to fluidically communicate to the thermal energy storage arrangement to produce the auxiliary steam flow upon being heated in the thermal energy storage arrangement.

9. The system as claimed in claim 8 further comprising valve arrangements adapted to depressurize the feedwater heating arrangement to produce the auxiliary steam flow for being heated in the thermal energy storage arrangement.

10. The system as claimed in claim 1 further comprising a steam accumulator adapted to fluidically communicate to the thermal energy storage arrangement to produce the auxiliary steam flow upon being heated in the thermal energy storage arrangement.

11. The system as claimed in claim 1, wherein the thermal energy storage arrangement comprises:
    first and second storage tanks adapted to store the thermal energy storage medium, wherein the first storage tank is adapted to store a relatively hot thermal energy storage medium, and the second storage tank is adapted to store a relatively cold thermal energy storage medium; and
    a heat exchanger disposed between the first and second storage tanks, wherein the relatively cold thermal energy storage medium from the second storage tank absorbs heat from the charging receiver steam in the heat exchanger to produce relatively hot thermal energy storage medium stored in the first storage tank, and wherein the relatively hot thermal energy storage medium from the first storage tank supplies the heat to the auxiliary steam flow in the heat exchanger to produce relatively cold thermal energy storage medium stored in the second storage tank.

12. The system as claimed in claim 1, wherein the thermal energy storage arrangement comprises:
    a single storage tank adapted to be divided into first and second sections using a partition in the single storage tank to store the thermal energy storage medium, wherein the first section is adapted to store a relatively hot thermal energy storage medium, and the second section is adapted to store a relatively cold thermal energy storage medium; and
    a heat exchanger fluidically configured to the storage tank, wherein the relatively cold thermal energy storage medium from the second section absorbs heat from the charging receiver steam to produce relatively hot thermal energy storage medium stored in the first section, and wherein the relatively hot thermal energy storage medium from the first section supplies the heat to the auxiliary steam flow in the heat exchanger to produce relatively cold thermal energy storage material stored in the second section.

13. The system as claimed in claim 1, wherein the thermal energy storage arrangement comprises a shell and tube heat exchanger having a shell side and a tube side, wherein the thermal energy storage medium is stored on the shell side, and wherein the heated steam flow and the auxiliary steam flow through the tube side to heat and cool the thermal energy storage medium respectively.

14. The system as claimed in claim 1, wherein the thermal energy storage arrangement comprises:
   a first member adapted to operate the thermal energy storage medium at a lower temperature range; and
   a second member adapted to operate the thermal energy storage medium at a higher temperature range, wherein relatively hot thermal energy storage mediums at the lower and higher temperatures are adapted to supply the heat to the auxiliary steam flow gradually.

15. The system as claimed in claim 14, wherein the lower and higher thermal energy storage medium are of different composition.

16. The system as claimed in claim 1, wherein the thermal energy storage arrangement comprises:
   a solid body adapted to be heated and retain the heat from the charging steam from receiver, wherein the retained heat in the solid body is supplied to the auxiliary steam flow to be heated.

17. The system as claimed in claim 1 further comprising a drainage mechanism to drain the auxiliary steam flow exiting from the superheater section.

18. The system as claimed in claim 1, wherein the thermal energy storage arrangement is of a relatively lower thermal capacity as compared to the solar receiver and is capable of receiving the predetermined portion of about 0% to about 10% of the total steam generated in the solar receiver.

19. The system as claimed in claim 1, wherein the thermal energy storage arrangement is adapted to be placed along with the solar receiver on a tower.

* * * * *